March 8, 1938. E. FISCHEL 2,110,622
AUTOMATIC SPEED STABILIZING DEVICE FOR AIRCRAFT
Filed March 7, 1935
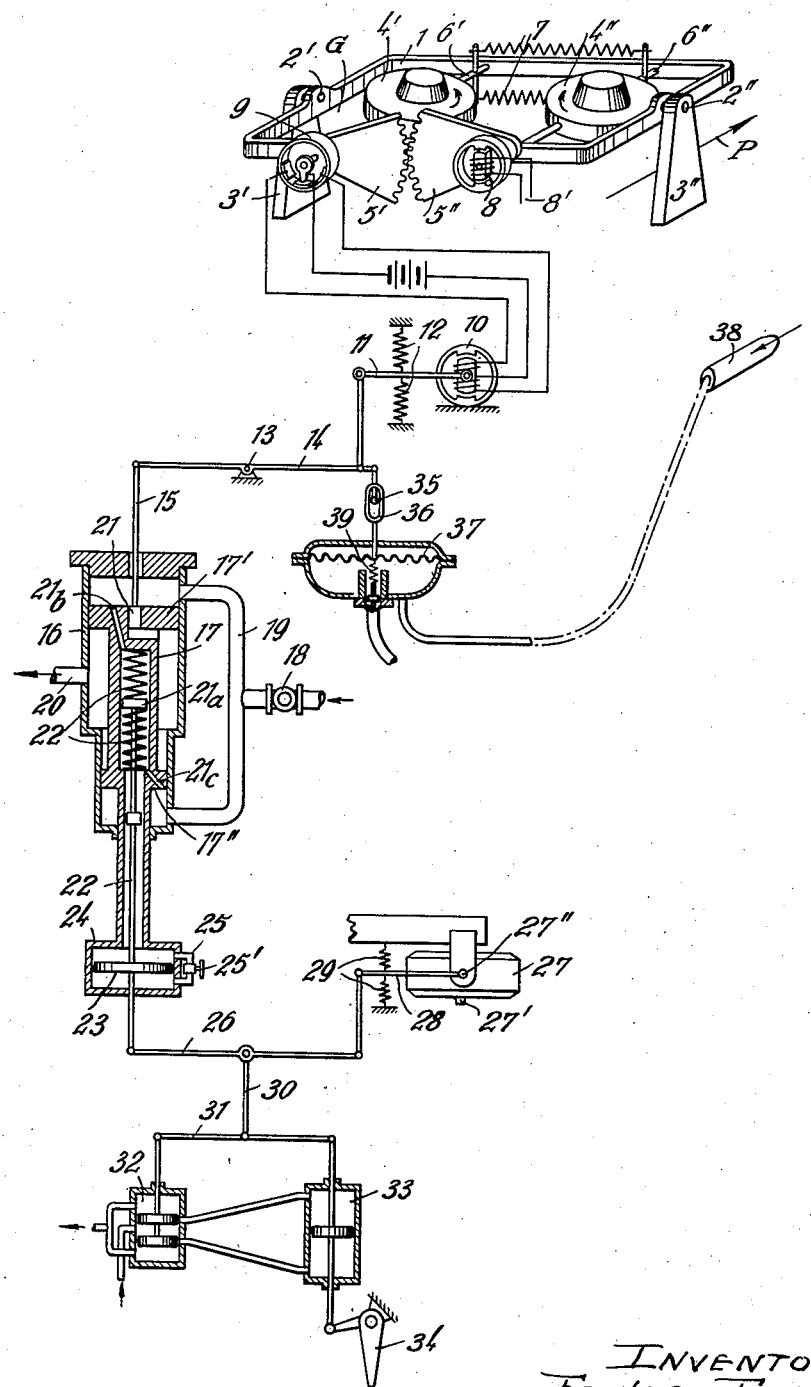
INVENTOR
EDUARD FISCHEL
BY
ATTORNEYS Patented Mar. 8, 1938

2,110,622

UNITED STATES PATENT OFFICE 2,110,622

AUTOMATIC SPEED STABILIZING DEVICE FOR AIRCRAFT

Eduard Fischel, Berlin-Charlottenburg, Germany, assignor to Siemens Apparate und Maschinen G. m. b. H., Berlin, Germany, a corporation of Germany Application March 7, 1935, Serial No. 9,820 In Germany March 7, 1934

13 Claims. (Cl. 244—78)

My invention relates to automatic speed stabilizing devices for aircraft, and more particularly for airplanes.

Speed stabilizing devices for aircraft in which the relative speed of flight is maintained constant by the automatic adjustment of the elevator in accordance with the departures of the relative wind speed from a desired speed to be maintained constant are well known. In this case the dynamic pressure of the relative wind acts, as a rule, on a diaphragm which is subjected to a counter-tension proportional to the desired speed of flight. The deflections of the diaphragm are then transmitted to the elevator by means of a correspondingly controlled servo-mechanism so that the control stick is pushed forward, if the relative speed of flight is too small, whereas it is pulled back if the relative speed of flight is too great.

The invention has for its object to provide a device for automatically stabilizing the absolute speed of flight, that is to say, the speed relative to ground of airplanes which may differ considerably from the relative speed of flight depending upon the force and the direction of the wind relative to the direction of course. The maintenance of the absolute speed of flight relative to ground to a constant value may be very desirable in many cases, particularly if commercial airplanes are to travel according to a certain schedule of times. The stabilization of the absolute speed of flight may be accomplished according to the invention by the elevator control of the airplane, for instance, by a servo-mechanism which adjusts the elevator, being automatically regulable in accordance with the deflections of a measuring device for the speed of flight relative to ground. In this case the regulation is only possible within certain limits determined by a relative wind speedometer. This is necessary in order to ensure the maintenance of the relative speed required for the minimum lift of the airplane at a constant value, in such cases in which the airplane is affected by a strong wind blowing in the direction of flight.

To avoid great changes of altitude of the airplane with the above stabilization of speed caused by the adjustment of the elevator control it is preferable to bring about simultaneously with this control an automatic stabilization of altitude by controlling the propelling force of the airplane in accordance with the departures from the desired altitude. This may be effected automatically in a manner well known in the art by controlling the supply of gas to the driving motors of the airplane by means of an altimeter which is set for the desired altitude, for instance, with the aid of a servo-mechanism.

Further details of the invention, particularly also the device serving to measure the speed of flight relative to ground are described hereinafter in connection with an embodiment shown in the accompanying drawing in a diagrammatic form.

The speedometer G consists of a frame 1, which is suspended by means of the two pivots 2' and 2" in the two supports 3' and 3", arranged transversely with respect to the direction of the longitudinal axis of the airplane indicated by the arrow P. The center of gravity of the frame 1 with the gyroscopes placed therein lies below the suspension axis 2'—2", so that the device constitutes a gyro-pendulum. In the frame there are two gyroscopes rotating in opposite directions which possess the same couple but in opposite directions and are so coupled with one another by means of toothed segments 5' and 5" that their deflections will be equal in angular extent but opposite in direction. The precession axes 6' and 6" mounted in the pendulum frame 1 are arranged in parallel relation to the direction of flight, whereas the axes of rotation of both gyroscopes are vertical, so that both gyroscopes are sensitive to swings about the transverse axis of the airplane. The gyroscopes are held in their zero position by springs 7 attached to the precession axes thereof. On the precession axis 6" a magnet 8 is arranged to turn in unison with said axis and with the casing of the gyroscope 4''', said magnet being energized in a manner well-known in the art through the conductors 8', which energization is proportional to the directional force acting on the gyroscopes in view of the rotation of the earth. The distance of the center of gravity of the entire gyro-pendulum from the suspension axis 2'—2", on the one hand, and the spring forces, on the other hand, are preferably so balanced that the gyro-pendulum possesses an oscillation period corresponding approximately to that of a mathematical pendulum of the length of the radius of the earth, i. e., amounting to approximately 84 minutes. The pendulum has then the property of remaining vertical at all times, independently of any horizontal acceleration. Furthermore, the gyroscopes, which are not under the influence of the actual rotation of the earth, indicate by their deflection of precession the speed which the airplane has relative to ground in the direction of the arrow P. The horizontal accelerations to which the pendulum is subjected cannot impair the vertical position and, therefore, can not cause the gyro-apparatus to oscillate. The speed relative to ground attained by adjusting the elevator control or by varying the propelling force of the airplane is, however, at once properly determined by a corresponding increased or decreased deflection of the gyroscope. The decrease of the deflection of the gyroscope is brought about by an electrolytic system 9 arranged on the precession axis 6'. The main electrode of the system 9 is disposed on the precession axis of the gyroscope 4' and the counter-electrodes arranged at both sides of the main electrode are secured to the casing of the electrolytic system, which casing is mounted on the pendulum frame 1 in any suitable manner (not shown) which permits said casing to be turned about its axis either by hand or, if desired, also by an electric remote transfer system in accordance with the speed of flight relative to ground to be maintained at a constant value in such a manner that the main electrode disposed on the precession axis of the gyroscope will swing with respect to the counter-electrodes in accordance with the departures of the speed of flight at that particular moment from the desired speed relative to ground.

The two currents flowing from the main electrode to the counter-electrodes of the electrolytic system serve to energize the coils, wound in opposite direction, of the armature of an electric pivoted magnet 10 whose contact arm 11 is, consequently, deflected opposite to the force of the springs 12 in accordance with the deflections of the main electrode relatively to the counter-electrodes. The deflection of the contact arm 11 corresponds, therefore, to the departure of the speed of flight at that particular moment from the desired speed relative to ground. These deflections are transmitted by means of the link 11' and the double lever 14 fulcrumed at 13 to the control needle 15 of a controlled valve. This valve consists substantially of the cylinder 16 and of the piston 17 displaceable therein. The piston 17 is designed as a differential piston having surfaces 17' and 17" of different areas. The pressure medium, for instance oil, is supplied to the cylinder 16 through a pressure regulating valve 18 and the conduit 19. 20 denotes the discharge conduit.

As is well known the controlled valve operates as follows: If the control needle 15 moves, for instance, in the downward direction it throttles at first the passage 21, so that the pressure in the upper chamber increases and the piston 17 moves, consequently, in the downward direction. If, however, the needle 15 moves in the upward direction the passage 21 is completely opened so that approximately the same pressure prevails at both sides of the passage 21. The oil then exerts pressure only against the lower piston surface 17" so that the piston moves in the upward direction until the needle 15 again throttles the passage 21 to such an extent that forces acting on both surfaces 17' and 17" of the differential piston are equalized or balanced. The piston will, therefore, practically follow the movements of the control needle 15.

Within the piston 17 a further piston 21a is slidably arranged which is secured to the control rod 22. The piston 21a is held in the central position shown in the drawing by springs 22'. Furthermore, the piston 23 of a damping cylinder 24 filled with oil or the like is arranged on the rod 22, the cylinder 24 being provided with a by-pass conduit having arranged therein an adjustable throttling valve 25'. The movement of the piston 21a depends upon the differential action of the pressures acting thereon through the channels 21b and 21c. The distance traversed is proportional to the adjusting speed of the piston 17. Since the latter moves, however, in proportion to the deflection of the pivoted magnet 10 the rod 22 is displaced in accordance with the deflection of the contact arm of the said magnet and with the speed with which this contact arm deflects. This additional adjustment of the speed in accordance with the departures from the desired speed relative to ground has the purpose of damping the oscillations, which occur in the regulating device in the neighborhood of the desired speed relative to ground.

The precession deflection of the reversing indicating gyroscope 27 transmitted to the right hand end of the differential lever 26 is superposed on the above-mentioned two control magnitudes acting on the left hand end of the differential lever. The rotation axis 27' as well as the precession axis 27" perpendicular thereto lie in the position of rest in a vertical plane determined by the direction of flight. The gyroscope is, consequently, sensitive to swings about the transverse axis of the airplane and deflects in accordance with the angular speed of the airplane swings about such transverse axis, since the arm 28 arranged on the precession axis is normally held in a central position by the springs 29. By means of a rod 30 and a lever 31, the sum of all three control magnitudes is transmitted to the control valve 32 for the servo-motor 33 adjusting the elevator 34. The servo-motor causes at the same time through the differential lever 31 the control valve 32 to return to its original position so that the deflection of the elevator is exactly proportional to the displacement of the rod 30, i. e., proportional to the sum of the above-mentioned three control magnitudes.

The departures of the speed of flight relative to ground from the desired speed adjusted or set on the electrolytic casing 9 act upon the elevator control only within a predetermined range. The right hand end of the differential lever 14 carries a hook 35 cooperating with a loop 36 which is secured to the diaphragm 37 of a differential manometer controllable from a distance, for instance by being connected to a Pitot static air speed indicator 38 exposed to the relative wind. The diaphragm 37 is preferably subjected by means of a spring 39 to a counter-tension in accordance with the relative wind pressure corresponding to the mean speed of the airplane. The deflections of the diaphragm 37 then correspond to the departures of the speed of the relative wind at that particular moment from this mean relative speed of flight. If the speed relative to ground owing to a strong wind differs considerably from the speed of the relative wind it will be apparent that when the relative speed of flight increases or decreases above or below a certain amount the diaphragm 37 adjusts the lever 14, it being assumed that the directional force of the magnet 10 as compared to that of the diaphragm 37 is relatively small.

The above-described device cooperates preferably with an automatic device (not shown) for stabilizing the altitude of the airplane which device may be designed in a well-known manner so that in the case of departures from the altitude to be maintained constant an altimeter— which the pilot may set by hand for the particular altitude desired—controls the gas supply to the driving motor of the propellers through a regulating device with servo-motor in such a manner that the propelling force is increased if the altitude drops below the predetermined value and is decreased if the altitude rises above the predetermined value. In the case, in which the speed of flight relative to ground lies below a predetermined constant value the speedometer G acts upon the control valve 32 through the magnet 10 and the controlled valve in such a manner that the control stick is pushed forward. The altimeter which now indicates an altitude below the predetermined value then influences the gas supply of the propeller motor, thus increasing the tractive force until the airplane has again attained the desired altitude. The tractive force of the motor will, therefore, be indirectly increased or decreased through the adjustment of the elevator and through the change of the altitude of the airplane caused thereby until the airplane has again attained the desired speed of flight relative to ground. In this case extremely small changes of altitude will practically occur, since both the device above-described for the stabilization of the speed and the device for stabilizing the altitude which influence the driving gear operate very sensitively.

I claim as my invention:

1. In an aircraft, a device responsive to the speed of the craft with respect to the ground, speed-stabilizing mechanism, an operative connection from said device to said mechanism, and means responsive to the speed of the craft with respect to the surrounding air, for interrupting or establishing said operative connection.

2. In an aircraft, a device responsive to the speed of the craft with respect to the ground, speed-stabilizing mechanism, an operative connection from said device to said mechanism, means responsive to the speed of the craft with respect to the surrounding air, and means, controlled by such first-mentioned means, for establishing said operative connection only when the speed of the craft with respect to the surrounding air drops below a predetermined limit.

3. In an aircraft, an elevator, a device responsive to the speed of the craft with respect to the ground, an operative connection from said device to said elevator, and means responsive to the speed of the craft with respect to the surrounding air, for interrupting or establishing said operative connection.

4. In an aircraft, an elevator, a device responsive to the speed of the craft with respect to the ground, an operative connection from said device to said elevator, means responsive to the speed of the craft with respect to the surrounding air, and means, controlled by such first-mentioned means, for establishing said operative connection only when the speed of the craft with respect to the surrounding air drops below a predetermined limit.

5. An apparatus according to claim 1, in which a Pitot static air speed indicator is employed as the means responsive to the speed of the craft with respect to the surrounding air.

6. In a propelled aircraft, a device responsive to the speed of the craft with respect to the ground, a speed stabilizing mechanism controlled by said device, and means responsive to the altitude of the craft for controlling the action of the aircraft propeller so as to counteract any variations in altitude that might be due to the operation of said speed-stabilizing mechanism.

7. In an aircraft, a gyroscopic device responsive to the speed of the craft with respect to the ground, said device comprising a gyroscope system free from the effect of the earth's rotation and mounted to swing about a suspension axis, and a speed-stabilizing mechanism controlled by said gyroscopic device.

8. In an aircraft, a gyroscopic device responsive to the speed of the craft with respect to the ground, said device comprising a gyroscope system free from the effect of the earth's rotation and mounted to swing about a suspension axis, a speed-stabilizing mechanism operatively connected with and controlled by said gyroscopic device, and adjustable means in the connection between said gyroscopic device and said speed-stabilizing mechanism for setting the desired speed to be stabilized.

9. In an aircraft, a gyroscopic device responsive to the speed of the craft with respect to the ground, said device comprising a gyroscope system free from the effect of the earth's rotation and mounted to swing about a suspension axis, a speed-stabilizing mechanism operatively connected with and controlled by said gyroscopic device, and adjustable means in the connection between said gyroscopic device and said speed-stabilizing mechanism, said adjustable means including a magnetic transmission controlled by a precession axle of said gyroscopic system and adjustable for setting the desired speed to be controlled.

10. In an aircraft, a gyroscopic device responsive to the speed of the craft with respect to the ground, said device comprising a gyroscope system free from the effect of the earth's rotation and mounted to swing about a suspension axis, a speed-stabilizing mechanism, an operative connection from said gyroscopic device and said mechanism, said connection including a movable member, and means for controlling said member in response to the speed at which the craft swings about its transverse axis.

11. In an aircraft, a gyroscopic device responsive to the speed of the craft with respect to the ground, said device comprising a gyroscope system free from the effect of the earth's rotation and mounted to swing about a suspension axis, a speed-stabilizing mechanism, an operative connection from said gyroscopic device and said mechanism, said connection including a movable member, and a reversing indicating gyroscope connected with said member and controlling it in response to the speed at which the craft swings about its transverse axis.

12. In an aircraft having its propelling force controlled for maintaining a desired altitude, an elevator, a device responsive to the speed of the craft with respect to the ground, an operative connection from said device to said elevator for adjusting the altitude of the craft as required to stabilize the speed of the craft.

13. In an aircraft, a device responsive to the speed of the craft with respect to the ground and means, controlled by said device, for stabilizing said speed of the craft.

EDUARD FISCHEL.